(12) United States Patent
Reardon et al.

(10) Patent No.: US 6,392,813 B1
(45) Date of Patent: May 21, 2002

(54) INTEGRATED MOLDED PLASTIC OPTICAL SYSTEM FOR A LASER DIODE COLLIMATING AND ABERRATION CORRECTION CONFIGURATION

(76) Inventors: Patrick J. Reardon, 190 Beaver Run Dr., Madison, AL (US) 35758; Paul E. Fileger, 2918 Green Mountain Rd., Huntsville, AL (US) 35803; Bruce R. Peters, 104 Sandusky St., Huntsville, AL (US) 35801; Tim A. Patterson, 220 Williams Broad Rd., Brownsboro, AL (US) 35741

( * ) Notice: Subject to any disclaimer, the term of this patent is extended or adjusted under 35 U.S.C. 154(b) by 0 days.

(21) Appl. No.: 08/964,935

(22) Filed: Nov. 5, 1997

(Under 37 CFR 1.47)

(51) Int. Cl.[7] .............................................. G02B 27/30
(52) U.S. Cl. ...................................................... 359/641
(58) Field of Search ................................ 359/618, 641, 359/811, 819

(56) References Cited

U.S. PATENT DOCUMENTS

| | | | |
|---|---|---|---|
| 5,239,414 A | * | 8/1993 | Reno ........................... 359/669 |
| 5,430,748 A | * | 7/1995 | MacCormack et al. ....... 372/29 |
| 5,808,803 A | * | 9/1998 | Ullmann et al. ............. 359/641 |

* cited by examiner

Primary Examiner—Ricky Mack
(74) Attorney, Agent, or Firm—Dickstein Shapiro Morin & Oshinsky LLP (57) ABSTRACT

A laser diode collimating and aberration correction (LDCC) molded plastic optical system having a refractive lens(es) to collimate fast axis and a refractive lens(es) to collimate the slow axis of the laser diode (this lens combination is termed a cross cylindrical lens system) with a diffractive element(s) to correct for astigmatism and provide circularization of the output laser beam. All optical elements are molded in plastic to high tolerances with regard to the surface optical figure (shape of the curved surface), surface roughness, and alignment between surfaces (tilt, rotation, and translation). With proper alignment of the optical system to a suitable laser diode emitter, the combination of optic and laser diode is capable of delivering diffraction limited performance—collimated beam, circular beam cross section, and no astigmatism.

13 Claims, 10 Drawing Sheets

SECT-AA

SECTION B-B

INTEGRATED MOLDED PLASTIC OPTICAL SYSTEM FOR A LASER DIODE COLLIMATING AND ABERRATION CORRECTION CONFIGURATION

BACKGROUND

The present invention relates to a method of providing integrated optical systems made up of precision molded plastic pieces that are quickly assembled and bonded into a one piece system without use of external alignment aids and references. Assembly to the necessary tolerances is accomplished by virtue of keyed and slotted parts and reference surfaces molded directly into the individual pieces to the precision necessary to effect the alignment. The molds are designed such that all optical surfaces are referenced to the built in alignment aids and the resulting parts slip together as rods into a tube, maintaining axial and radial alignment by virtue of keyed and slotted guides. Longitudinal alignment is accomplished by contact of reference surfaces which preclude further insertion of one component into another. Once assembled, a single drop of bonding agent will lock two such pieces together permanently.

The individual molded parts each include two optical surfaces. In the current embodiment these surfaces comprise refractive or diffractive optics. Future embodiments may also include mirrored surfaces, but these embodiments will require extra steps in manufacturing to coat the mirrored surfaces. Refractive surfaces may include aspheres or anamorphic devices of a variety of shapes. Diffractive binary elements of up to eight layers and one micron precision have successfully been manufactured. Refinement of the processes may improve this performance. Simple systems comprised of up to four surfaces can be manufactured from two molded pieces. More complex optical systems may require three or more molded pieces, each pre-engineered to provide the precision alignment features and reference surfaces allowing simple assembly without additional mechanical or optical aids.

In laser diode collimating and aberration correction (LDCC) molded plastic optical systems, edge emitting laser diodes experience an inherent large divergence angle of the emitted light (called the fast divergence axis) and a less divergent angle in the orthogonal direction (called the slow divergence axis), such that the effective size of the illumination area grows very rapidly as the light propagates away from the emitter. For some applications, it would be desirable to have the energy emitted from the diodes to be collimated (minimize the divergence as a function of distance from the laser diode) in a beam that is as small and as uniform in shape (circular) as possible. This is the case in numerous applications, such as laser imaging/illumination, fiber optic communications, and in laser bar code scanners where the successful operation of the device is dependent upon whether there is sufficient brightness (laser light intensity confined to a small beam size) of light present at the desired plane at a location removed from the laser diode. The more divergent a laser beam is, the more rapidly the intensity decreases over a constant cross sectional area normal to the direction of propagation. Typically, the more divergent the laser beam, the more difficult it is to collimate the beam.

Highly divergent sources, including laser diodes, usually require optics that produce non-spherical wave fronts (aspheric refractive surfaces or complex phase function diffractive optics) to achieve diffraction limited collimated performance. The aspheric surfaces are usually defined by the radius of curvature (as if the surface was a perfect sphere) and the conic constant (the deviation of the surface from the perfect sphere). The large divergence of the laser diode fast axis usually requires a highly aspheric surface that is often very difficult to fabricate. As the surface approaches a sphere it is usually easier to fabricate but the degree of collimation decreases due to aberrations.

In addition, the fast and slow axes divergences are different which causes ellipticity in the cross sectional shape of the beam. This problem is linked to astigmatism. Astigmatism manifests itself as a difference in the origination point of the divergence of the fast axis relative to the slow axis. Because of the astigmatism, any optical lens system that attempts to collimate the beam must possess different optical power in the two orthogonal axes because the fast axis divergence is typically three to four times greater than the orthogonal slow axis divergence. In order to achieve collimation, an anamorphic lens (a single lens that has different optical power in two orthogonal axes) or a pair of cylindrical lenses (termed a cross cylindrical lens system) is required. To fabricate aspheric anamorphic lenses is difficult and costly. Therefore, aspheric crossed cylinders are often employed to collimate the beam. While either of these approaches is capable of collimating the laser output, special attention must still be given to the selection of the optics to achieve a circular cross sectional shape for the beam.

A further consideration with regards to the performance of the optical system is that the system should be achromatic over a specified waveband. The lenses in the system must be achromatized such that different wavelengths of laser diode light still focus to the same point. This is necessary to compensate for laser wavelength instabilities inherent in the laser diode due to electrical and thermal fluctuations. Added versatility can also be achieved by achromatizing the system because once this is done, a single system can often serve a wide waveband instead of having to fabricate many different systems for every different wavelength of laser diode.

Lastly, it is desirable to minimize the diameter of the collimated beam. The smallest beam diameter is usually a function of how closely the optical surfaces or lenses can be placed to each other. Since all conventional refractive lenses rely on material thickness to retard the wave front and thereby bend and focus the light, the conventional lenses require some finite spacing away from the laser diode which produces a certain collimated beam diameter. While it is usually easiest to manufacture and align optical systems that contain components that are on the order of millimeters in diameter, it is possible to decrease the element sizes through the use of diffractive optics and micro-diffractive optics. Diffractive optics are one way to reduce material thickness and permit more elements within less space. Micro-diffractives (sub millimeter sizes) are another method but these lenses are more difficult to align. The result is that the optical elements can be located closer to the laser diode and the result is a smaller diameter output beam.

The laser systems of known systems rely on individual elements that must be aligned one to another and then bonded into a complete system. This approach is both labor and time intensive which increases cost and prohibits the mass production of devices. The plastic molded approach only requires a single high fidelity alignment of the actual mold and once completed, the replicated parts maintain this precision. In addition, the optical design has been optimized and reduced in size to the point where the collimated beam is as small as possible without having to violate the integrity of the laser diode.

Most previous optical systems for a wide variety of applications have been constructed of discrete components that must be mechanically mounted and aligned by various optical and interferometric means. These optical surfaces of these individual components are generally manufactured by grinding and polishing of glasses, metals or plastics, and in some cases by molding of plastic. The assembly is typically very manpower intensive and requires tedious and difficult alignment procedures.

Past optical systems formed the output of a laser diode into a single mode, near diffraction limited beam using a collection of components (lenses, microlenses, diffraction gratings, prisms, coatings, binary optical elements, GRIN optical elements, and combinations of refractive and diffractive (binary) optics) assembled together by mechanical means and aligned by various optical and interferometric means. Many such embodiments of collimators and other beam shaping optics for diode lasers have been described in the literature and in various patents. Diodes with several of these previous embodiments are available from various manufacturers. Most of these embodiments are quite costly because of the manpower intensive assembly and alignment requirements. Most such embodiments also fall short of desired performance.

The present embodiment of an integrated molded plastic optical system comprises a four surface refractive/diffractive combination to effect the collimation of a laser diode into a near diffraction limited circularized beam. Laser diodes are typified by a fan-like output characteristic of their slit-like radiating aperture.

The specific design of this embodiment effects a narrow, collimated and circularized beam for potential application to laser bar code readers or similar devices. This embodiment also, coincidentally is comprised of a combination of anamorphic refractive surfaces and a diffractive surface. The design collimates, corrects for astigmatism and is achromatic over a significant waveband. The achromatic feature allows the same device to be used with diode lasers of a variety of wavelengths and still deliver near-diffraction limited performance. Near diffraction limited performance requires tolerances on alignment and on all optical surfaces to be such that the output wavefront deviates from a diffraction limited beam by less than ¹⁄₄₀th of a wavelength.

A specific embodiment depends on the desired application. In some cases a small collimated and circularized beam such as the present embodiment may be desired. In others a larger diameter, more slowly diverging collimations is preferred. Sometimes a focused spot is desired, in others re-imaging of the slit aperture with some magnification is desired. Each such embodiment requires a different optical design. Moreover, a given application can have an infinite number of optical design solutions.

Use of molded optics, both of glass and plastic, have been proposed. However, at the time of these proposals, residual stresses in the material resulting from the molding processes resulted in refractive properties that were inadequate to the task of delivering aberration free optical beams. Recent developments in plastic optics have effected components with sufficient precision that discrete component devices can now be built of molded optics. These recent developments are essential to the processes involved in all embodiments of integral molded plastic optical systems.

SUMMARY

There is provided by this invention a variety of processes that culminate in molded plastic pieces that are directly assembled and bonded without external mechanical or alignment aids to comprise complete integrated molded plastic optical systems. These processes include the following:

1. Optical design processes to optimize a given design for the precision molding process and subsequent simple assembly.
2. Processes to manufacture the optical masters, including ashperes, anamorphic surfaces and diffractive surfaces into hard metals with the necessary precision to effect the precision mold.
3. Processes to effect the precision mold that includes sliding precision pins in the mold cavities that form the plastic components with the built in alignment aids.
4. Processes that include optical pins with the negatives of the desired optical surfaces for molding aspheric and/or anamorphic refractive components.
5. Processes that include optical pins with the negative of diffractive surfaces to effect the required molding of these surfaces.

The essence of the invention is that precision manufacture, assembly and alignment is required only once and is applied to the optical masters, the mold cavity, the sliding pins and their subsequent assembly and alignment. Once this is performed any number of optical systems can be produced, assembled and bonded into an integrated optical system without mechanical or alignment aids. Thus the manufacturing costs associated with precision manufacturing, assembly and alignment is spent only once and is amortized over a large number of systems. The result is higher quality systems at lower cost.

The present embodiment of the invention is a mold for mass production of a Laser Diode Collimating and Aberration Correction (LDCC) plastic optical system.

One object of the invention is to place an optical system that is composed of several optical surfaces (aspheric refractive surfaces and a non-axisymmetric diffractive surface) aligned relative to each other in a configuration that is placed in front of a laser diode and positioned as a single optical element such that the optical system is aligned relative to the emitter of the diode. The optical system will collimate the output from the emitter of the laser diode such that the laser beam is collimated to diffraction limited performance and that the output beam is circularized and corrected for the astigmatism.

Another object of the present invention is that the optical system has been achromatized in order to compensate for laser wavelength drift.

Another object of the present invention is that the optical elements shall be optimized with respect to size in order to create a compact system that has a reasonably smaller output beam than is possible with conventional lens systems. All of this must be accomplished outside of the laser diode package and be reasonable to align to the diode without complex special kinematic optical positioning equipment.

Other objects and advantages of the present invention will be readily apparent from the following description and drawings which illustrate a preferred embodiment of the invention.

BRIEF DESCRIPTION OF THE DRAWINGS

FIG. 3b is a schematic cross sectional view taken along section line IIIb—IIIb of FIG. 3a.

DETAILED DESCRIPTION OF A PREFERRED EMBODIMENT

Figure 1:
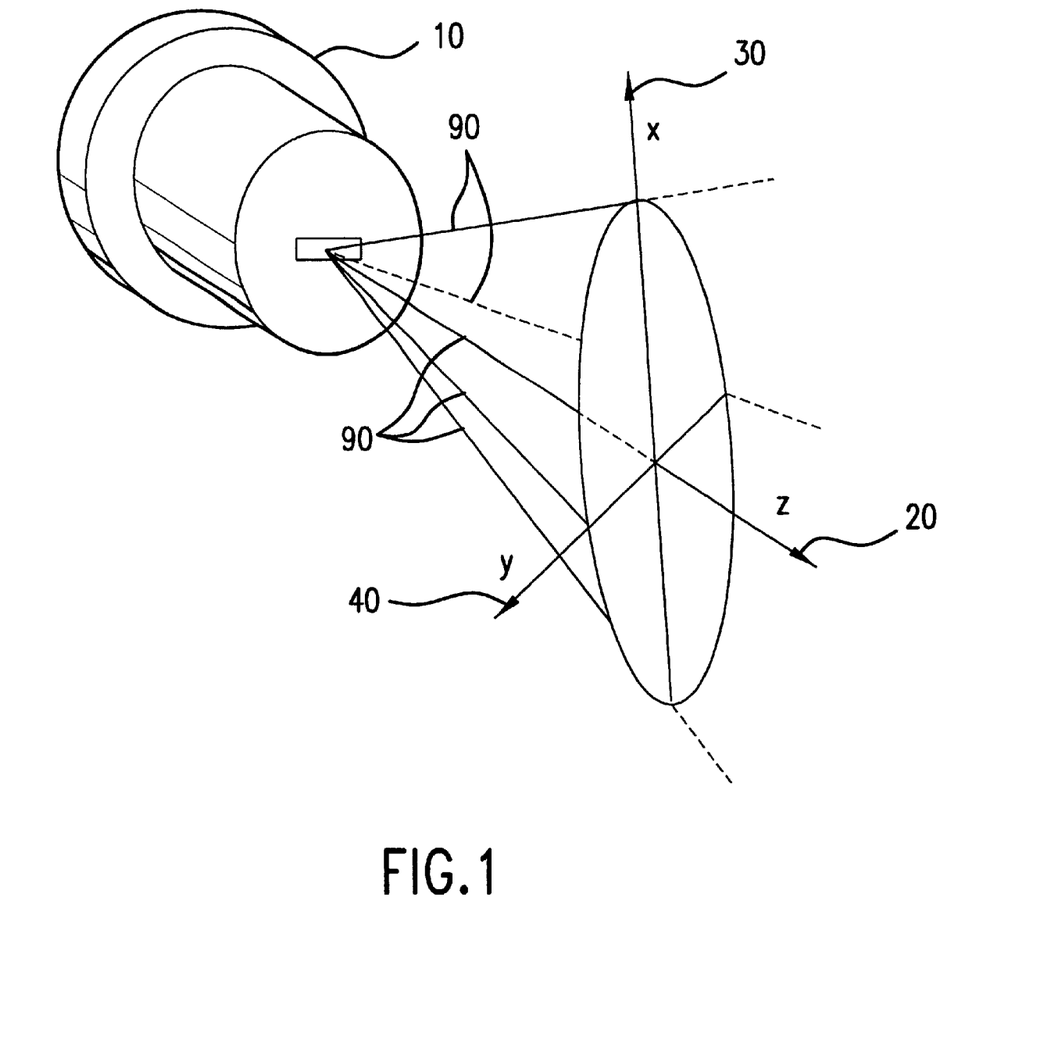
FIG. 1 is a schematic view of a beam exiting a laser diode emitter.

FIG. 1 is a schematic view of a beam 90 exiting a laser diode emitter 10 along an axis of propagation 20. The beam experiences an inherent large divergence in a direction perpendicular to the axis of propagation 20. This direction is called the fast divergence axis 30. The beam also experiences an inherent smaller divergence in a direction orthogonal to the fast divergence axis 30. This direction is called the slow divergence axis 40.

Figure 2:
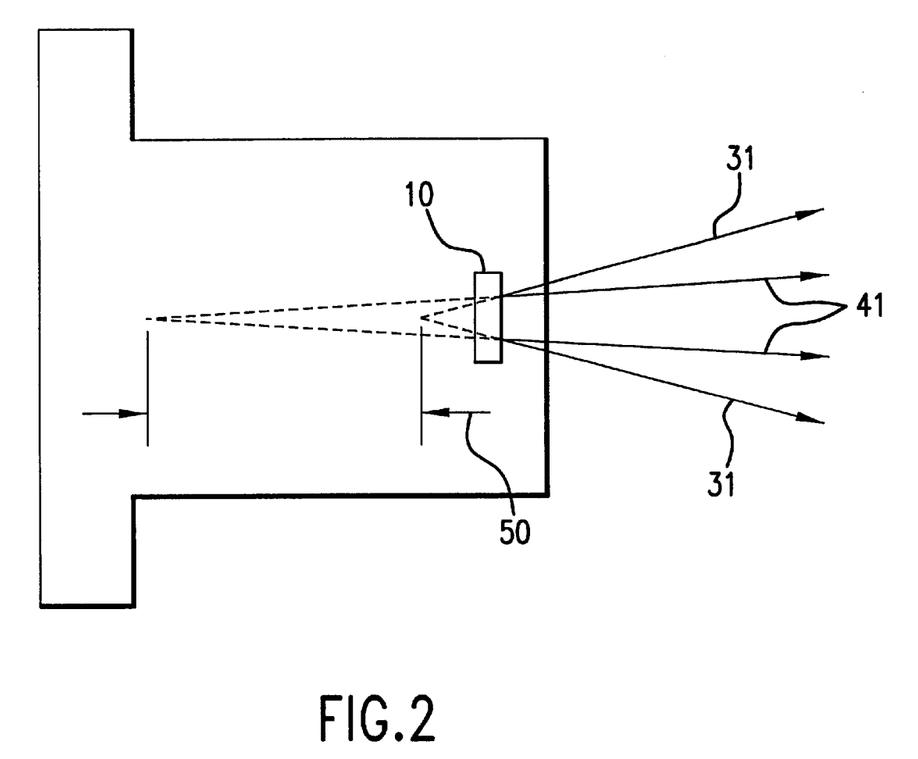
FIG. 2 is another schematic view of the beam shown in FIG. 1.

FIG. 2 is another schematic view of the beam 90 as it exits the laser diode emitter 10 shown in FIG. 1. The difference between the imaginary point behind the emitter 10 at which the boundaries 31 of the beam on the fast divergence axis 30 converge and the point at which the boundaries of the beam 41 on the slow divergence axis 40 is called the system's astigmatism 50.

Figure 3A:
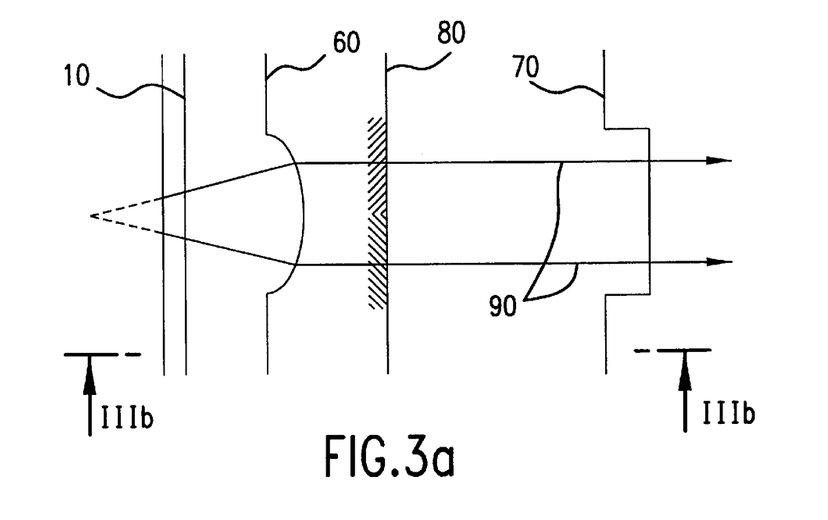
FIG. 3a is a schematic view of a preferred embodiment of a LDCC molded plastic optical system according to the present invention.
Figure 3B:
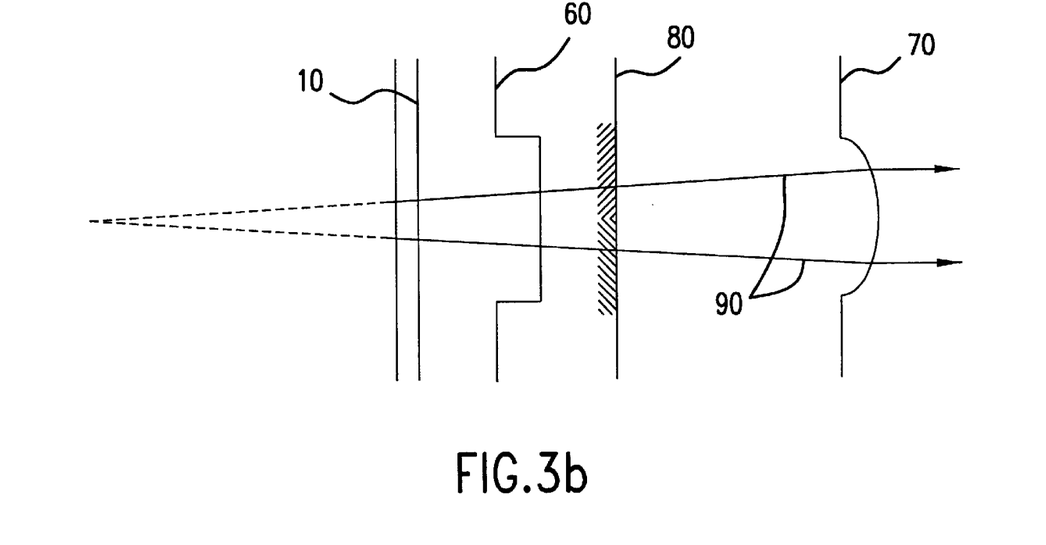

Refer to FIG. 3a, which shows a schematic view of a preferred embodiment of a LDCC molded plastic optical system according to the present invention, and FIG. 3b, which shows the same system along section line IIIb—IIIb.

When beam 90 exits emitter 10 it first passes through aspheric refractive surface 60. Ashperic refractive surface 60 captures most of the beam 90 in the fast axis and decreases its divergence to nearly diffraction limited collimation.

The beam 90 then passes through the diffractive optical element 80. The principle function of the diffractive optical element 80 is to act upon the phase front of the laser beam 90 to correct for astigmatism, circularize, and achromatize the beam.

Finally, the beam passes through another aspheric refractive surface 70. Aspheric refractive surface 70 is oriented such that it is crossed with ashperic refractive surface 60 and captures and collimates the slow axis of the laser diode. The second aspheric surface is positioned such that the diameter of the output beam 90 in both fast and slow axes is equal after exiting the optical system.

Figure 4:
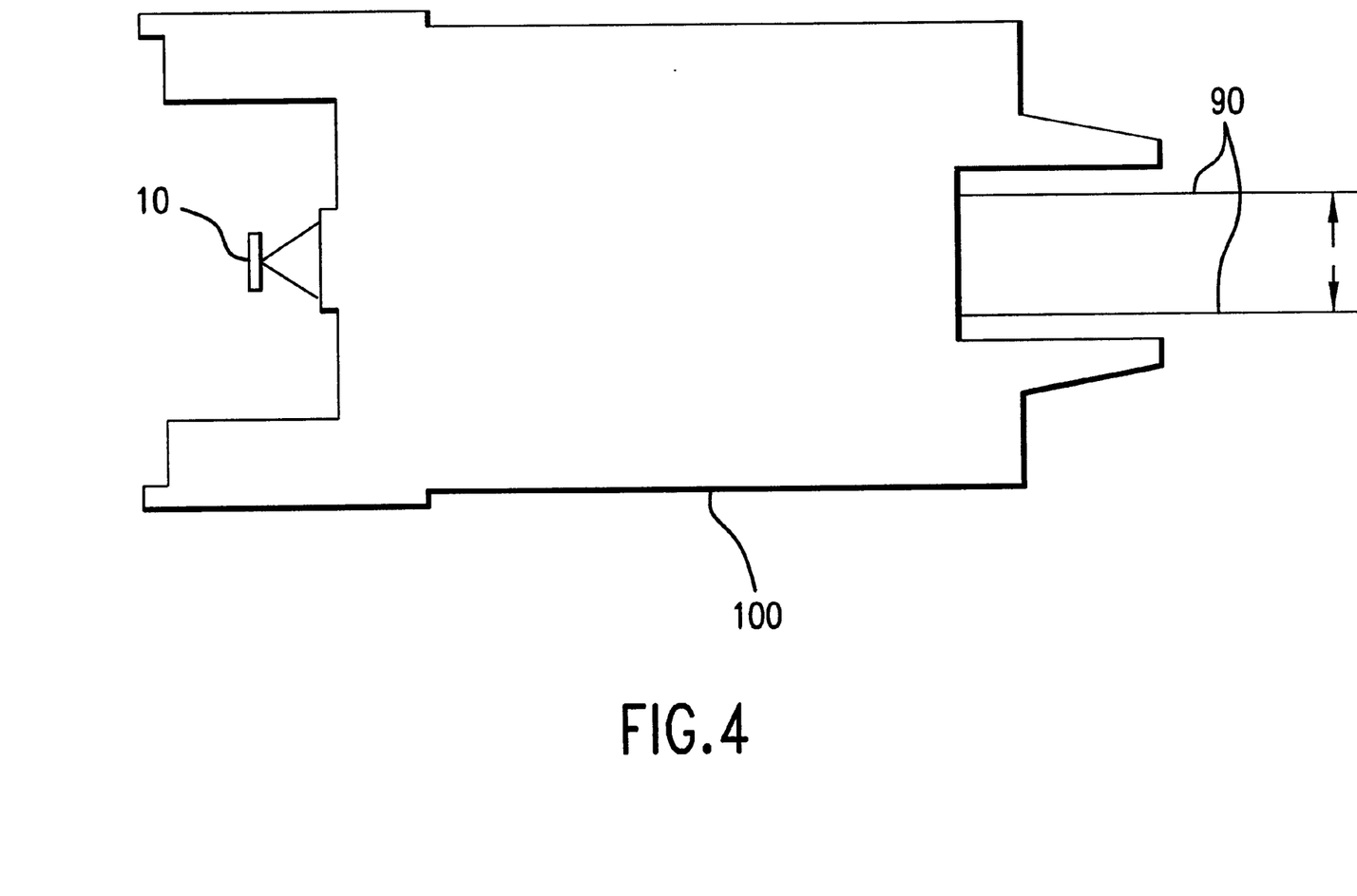
FIG. 4 shows the LDCC molded plastic optical system according to the present invention.

FIG. 4 shows the LDCC molded plastic optical system 100 according to the present invention. Since the optical system 100 must lie completely outside of the laser diode package 10, the minimum laser beam 90 diameter is a function of how quickly (how closely placed and how much optical power can be placed within the first optical surface) the optics can capture the fast axis divergence light.

For the optical system to function with adequate efficiency, the elements must be aligned along the optical axis with regards to translation (normal to the surface) and rotation (tilt) in addition to the exact location along the optical axis. A conventional approach is to fabricate separate elements and align one element to another using traditional optical alignment techniques. The system can then be bonded into a single device and wrapped with a housing to hold all of the elements. However, this requires that every system must be custom aligned and bonded, precluding any potential for mass production. The approach according to an alternative is to combine the elements into fewer plastic pieces and then rely on high precision alignment lugs to establish a mechanical bonding of the devices. The fidelity and precision required to do the metal mold masters requires that the pieces of the mold need only be aligned once to each other. Subsequently, all of the resulting parts will be replicated from the old and will have the same accuracy of alignment without having to spend any additional effort.

The fabrication of the mold masters is separated into two types—refractive and diffractive. The refractive surfaces are negatives of the desired aspheric surfaces cut into the metal pin surface using conventional grind/polish or single point diamond turning to achieve an optical finish on the surface. The diffractive master is a negative of the desired multiphase function and it is created using standard binary diffractive optics fabrication techniques. The phase function can be created using lithographic patterns combined with etching or by single point diamond turning. Both the refractive and diffractive surfaces many need to be overly sized to account for shrinkage effects in both the depth, length, and width of the final plastic part. The correction factors or scaling factors are plastic and plastic process dependent and are usually determined empirically after several test runs.

The fabrication of the diffractive pin involves a series of high resolution lithographic and optical processes. The first step is to coat the pin with a thin layer of positive photoresist. Using a mask aligner, the pin is placed in intimate contact with a microlithographic mask which contains the pattern that will eventually be etched into the pin. The mask/pin combination is then illuminated with an ultraviolet lamp source. After the exposure, the photoresist is developed, and the resist that was exposed to the UV light is washed away, leaving a pattern in the photoresist layer. This pattern is transferred into the pin by ion milling. To produce an eight-level diffractive, the above process must be performed three times. The last two iterations involve aligning a slightly different version of the initial mask to the pattern that is already etched into the pin.

Figure 8:
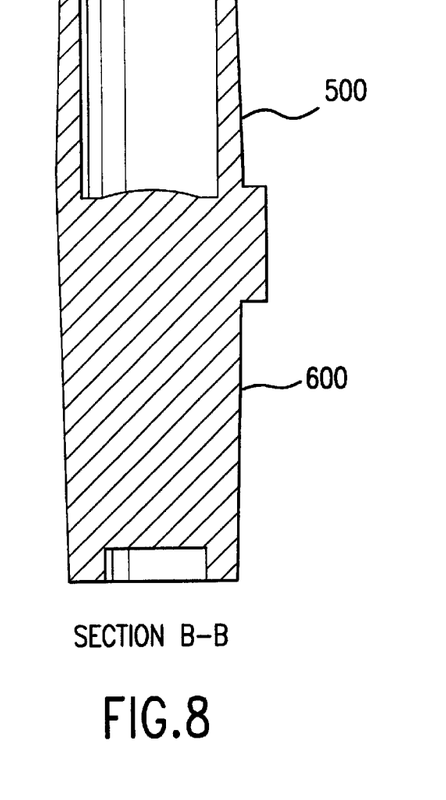
FIG. 8 is a sectional view of the component shown in FIG. 9 taken along section line B—B.
Figure 9:
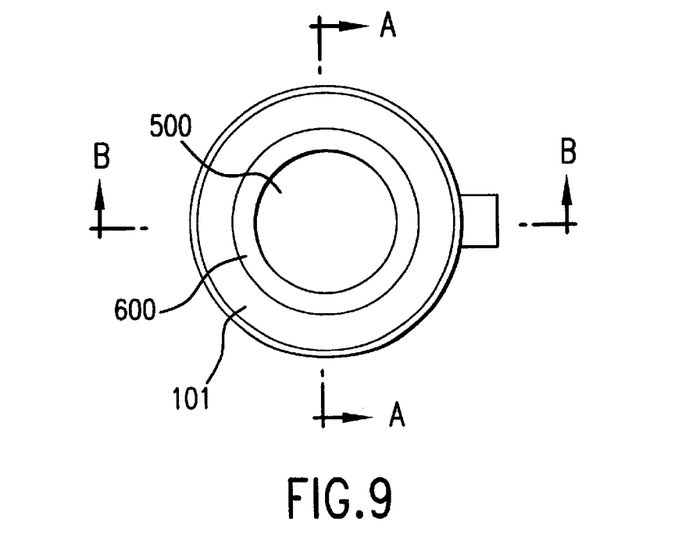
FIG. 9 shows an end view of a component in the LDCC molded plastic optical system according to the present invention.
Figure 10:
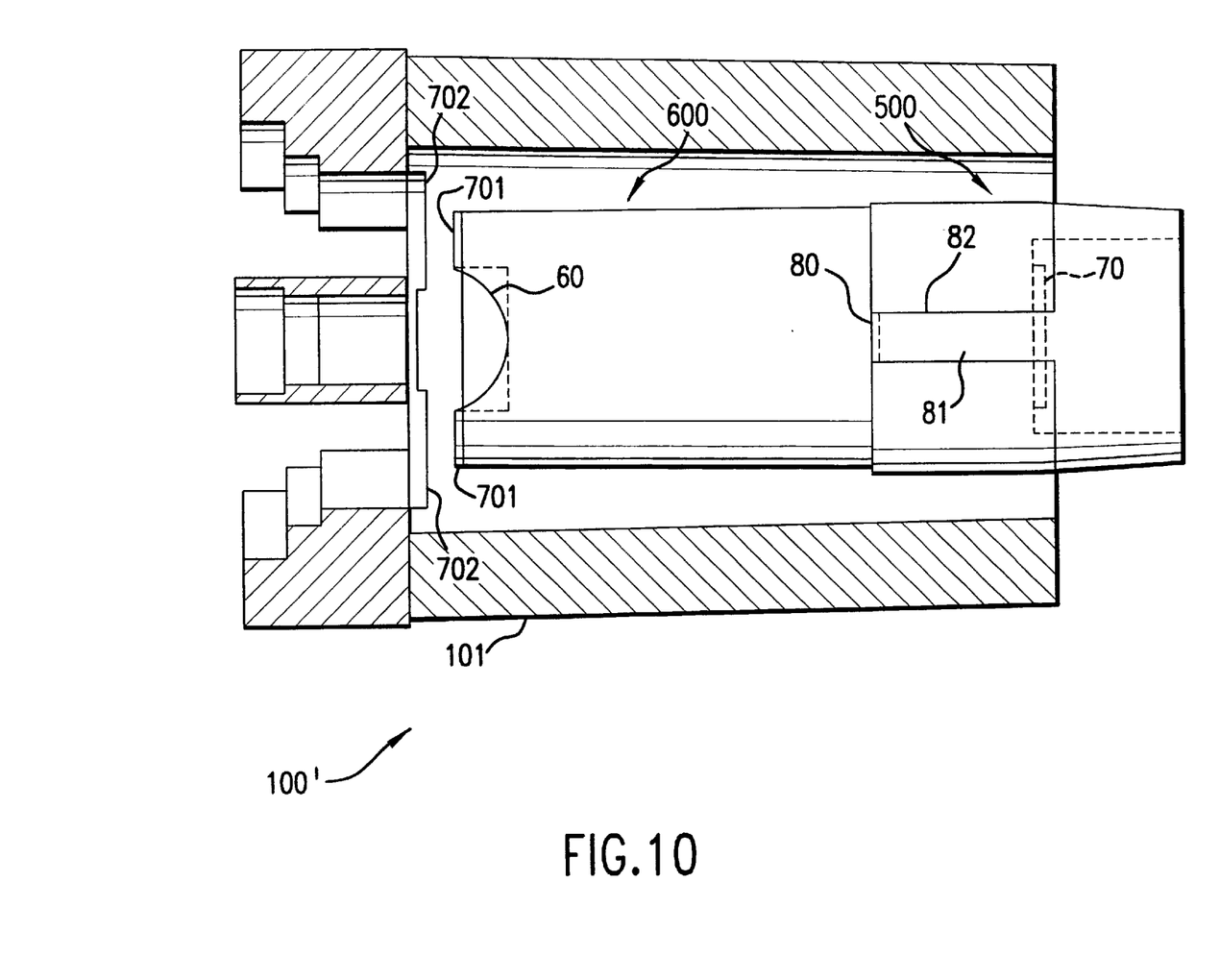
FIG. 10 shows the completed assembly of the LDCC am molded plastic optical system according to the present invention.
Figure 12:
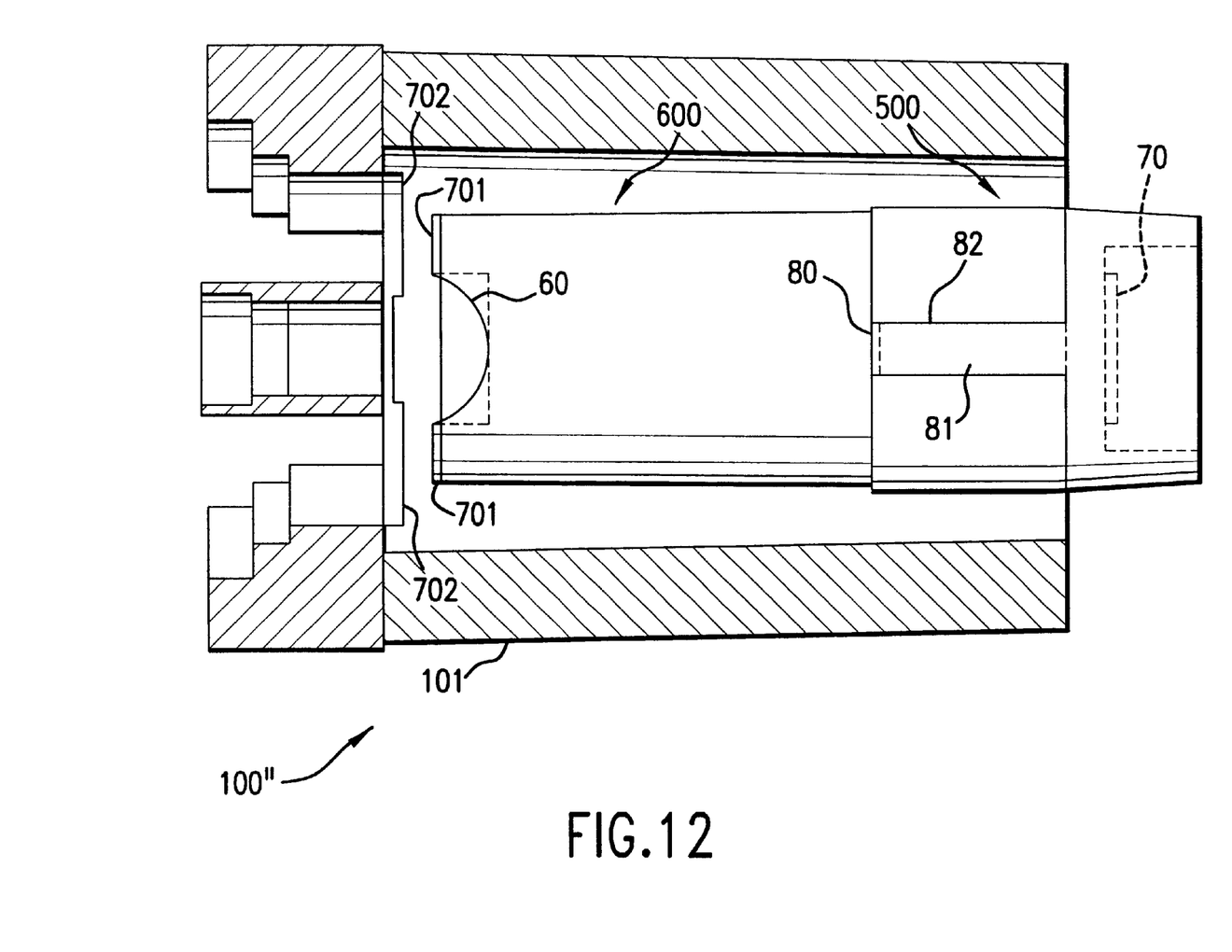
FIG. 12 shows the completed assembly of another embodiment of the LDCC molded-plastic optical system.

FIGS. 10 and 12 illustrate two LDCC molded plastic optical systems 100', 100" constructed in accordance with the principles of the present invention. FIGS. 8 and 9 are alternate views of the optical system 100'. More specifically, FIG. 9 is an end view of optical system 100' while FIG. 8 is a sectional view of FIG. 9 taken along section line B—B. As illustrated, each optical system 100', 100" includes a frame 101, a plurality of molded plastic parts (i.e., components) 500, 600, a pin 81, and alignment aids 701, 702.

Figure 5:
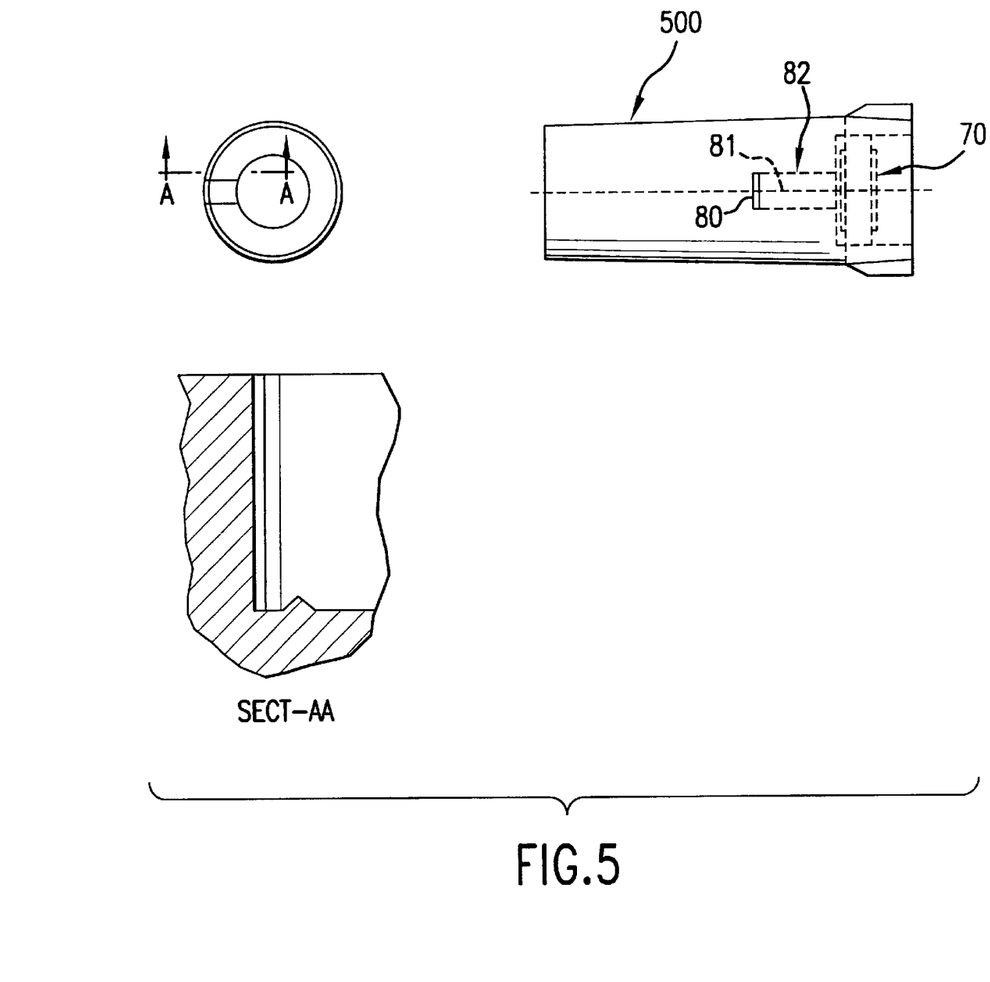
FIG. 5 shows a lens used in the LDCC molded plastic optical system.

Molded plastic part 500 is also illustrated in FIG. 5. The component 500 includes a refractive optical element 70 and an alignment aid in the form of a slot 82. The slot 82 accepts and aligns a pin 81 having a diffractive optical surface 80 at one end of the pin 81.

Figure 6:
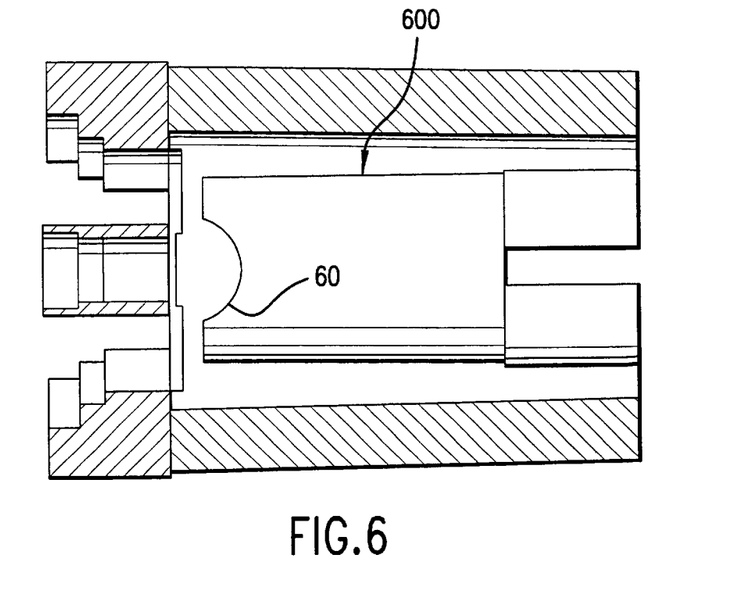
FIG. 6 shows a second lens used in the LDCC molded plastic optical system.

Molded plastic part 600 is also illustrated in FIG. 6. The component 600 includes a refractive optical element 60 and alignment aids 701. The alignment aid 701 is designed to operate in cooperation with alignment aids 702 located on another portion, for example, a portion of the frame 101, of the optical system 100', 100".

Figure 7:
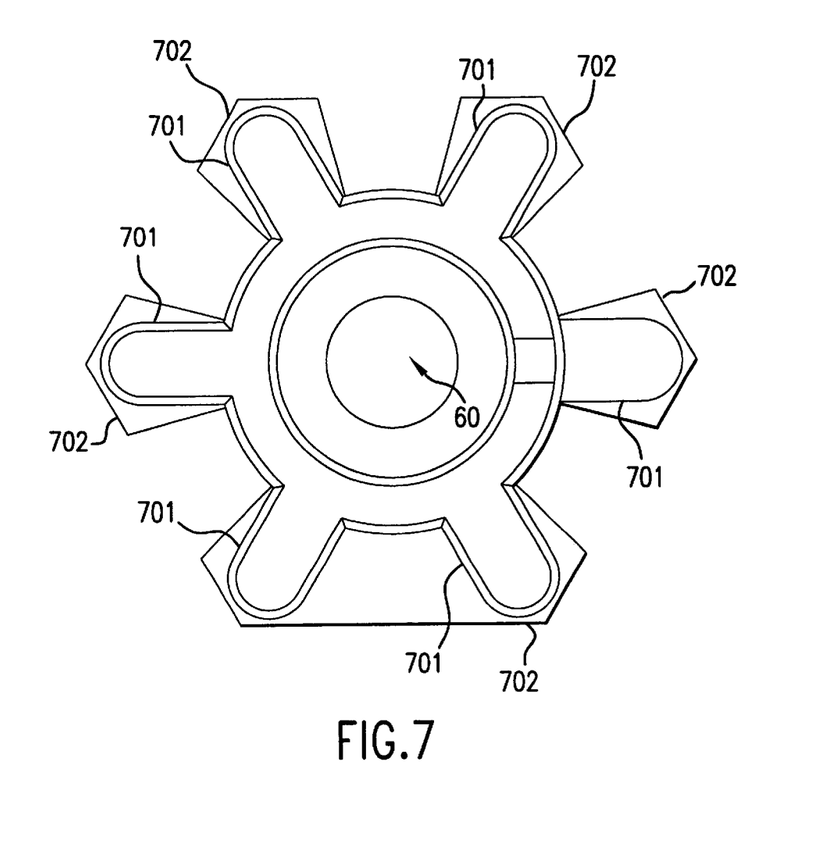
FIG. 7 shows the keyed/slotted feature of a component in the LDCC molded plastic optical system according to the present invention.
Figure 11:
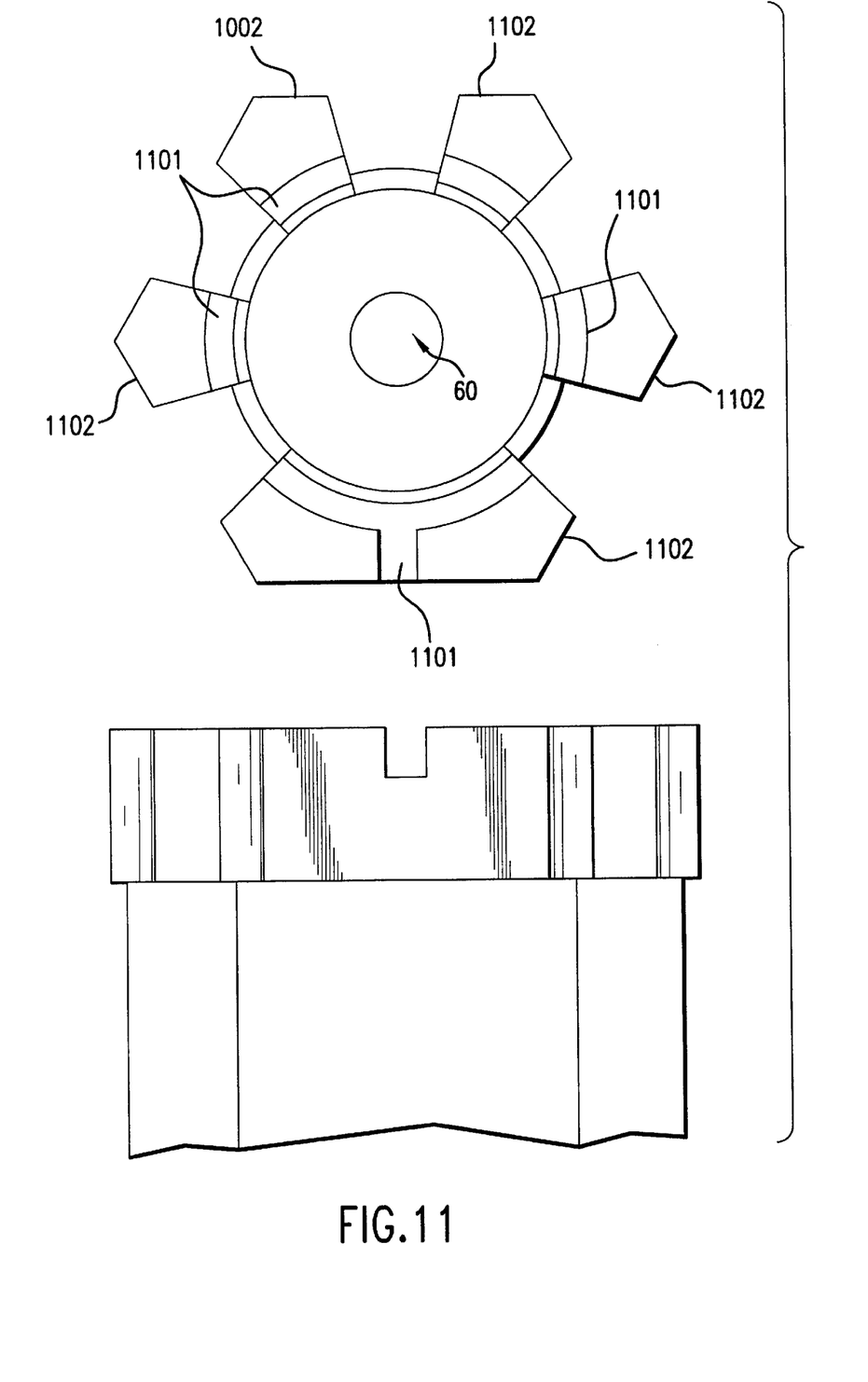
FIG. 11 is another view of the keyed/slotted feature of a component in the LDCC molded plastic optical system according to the present invention.

In one embodiment of the invention, alignment aids 701, 702 are part of a keyed/slotted alignment system as illustrated in FIG. 7. The keyed/slotted alignment system includes at least one key 701 and a corresponding number of slots 702. An alternate embodiment of the keyed/slotted alignment system is illustrated in FIG. 11 with keys 1101 and slots 1102.

Although a preferred embodiment is specifically illustrated and described herein, it will be appreciated that modifications and variations of the present invention are covered by the above teachings and within the purview of the appended claims without departing from the spirit and intended scope of the invention. For example, the present embodiment comprises a very small device to collimate the diode laser output to a small diameter for potential use in bar code readers and similar applications. Other embodiments may be much larger, and comprise many more surfaces, and therefore, more pieces per assembly. The composite means of effecting the present embodiment; mastering, molding, keying, slotting, and generation of reference surfaces providing for simply assembly, alignment on assembly and simple bonding procedures to hold the overall assembly together can be applied to these more complex embodiments to sizes many times larger. Some possible embodiments are listed below:

a. imaging optics for miniature surveillance cameras;

b. imaging optics for video cameras, including combinatorial assemblies that move with respect to one another to comprise zoom optics;

c. imaging optics including features of b above to effect inexpensive, high performance binoculars;

d. optics for copying machines;

e. optics for reading codes and names for credit card devices;

f. optics including features of b above to effect inexpensive, high performance microscope systems;

g. optics including features of b above and including diffractive optical elements to effect inexpensive, high performance phase contrast microscopes;

h. optics to focus laser diode energy to a small spot to be used for reading and writing CD-ROMs, optical storage discs, floptical discs, etc.;

i. optics to combine coherent diode array outputs to effect single mode diffraction limited performance for applications requiring more power than available from a single diode;

j. optics to couple into other devices or systems, such as fiber optic communication systems, or for coupling energy from diode lasers into solid state laser rods to effect diode pumped solid state lasers; and k. Multi-element, wide angle lenses for photographic cameras, projectors, and other devices, some including features of b above for focusing or zooming.

What is claimed as new and desired to be secured by Letters Patent of the United States is:

1. A laser diode collimating and aberration correction molded plastic optical system comprising:

an emitter that propagates a beam having a first axis perpendicular to the direction of propagation and a second axis orthogonal to said first axis;

a first cylindrical lens optic for collimating said beam along said first axis;

a diffractive surface for collimation of said beam along said first axis and said second axis; and a second cylindrical lens optic for collimating said beam along said second axis;

wherein each of said first cylindrical lens optic, said diffractive surface and second cylindrical lens optic are molded in plastic and include an alignment aid, and wherein said alignment aids mechanically couple the first cylindrical lens optic, the diffractive surface, and the second cylindrical lens optic into an alignment with respect to said first axis and said second axis.

2. The system of claim 1, wherein said first cylindrical lens optic, said diffractive surface and second cylindrical lens optic are mechanically bonded to one another.

3. A method of making an optical system for collimating and correcting aberration of a beam, said method comprising the steps of:

molding a first optical portion with a first molded element, wherein said first optical portion includes a first alignment aid;

molding a second optical portion with a second molded element, wherein said second optical portion includes a second alignment aid;

aligning said first and second optical portions by coupling said first alignment aid and said second alignment aid.

4. The method of claim 3, further comprising the step of using high pressure compression molding to form said first and second optical portions.

5. The method of claim 3, further comprising the steps of forming said first optical portion with an optical flat surface and with a first aspheric refractive optical surface, and forming said second optical portion with a diffractive optical surface and with a second aspheric refractive optical surface.

6. The method of claim 5, further comprising the step of assembling said first and second optical portions together so that said optical flat surface, said first aspheric refractive optical surface, said diffractive optical surface, and said second aspheric refractive optical surface are aligned with said beam.

7. The method of claim 3, further comprising the step of using a mold cavity and at least one pin to form the first and second optical portions.

8. The method of claim 7, further comprising the step of using a negative of a molded multi-layered diffractive optical pattern to form said second optical portion.

9. The method of claim 7, further comprising the step of forming a refractive surface on said first optical portion by using a negative aspheric optical surface.

10. The method of claim 9, further comprising the step of grinding and polishing said refractive surface.

11. An optical system, comprising:

a laser diode for propagating a beam having a first axis perpendicular to the direction of propagation and a second axis orthogonal to said first axis; and a molded optical device for collimating and correcting aberration of said beam, said optical device including
a molded first optical portion for collimating said beam along said first axis, and
a molded second optical portion for collimating said beam along said second axis, and
wherein said molded first optical portion and said molded second optical portion include a key and a slot and are aligned by the key and the slot.

12. The system of claim 11, wherein said first optical portion comprises an optical flat surface and a first aspheric refractive optical surface, and said second optical portion comprises a diffractive optical surface and a second aspheric refractive optical surface.

13. The system of claim 12, wherein said optical flat surface, said first aspheric refractive optical surface, said diffractive optical surface, and said second aspheric refractive optical surface are aligned with said beam.

* * * * *